(12) United States Patent
Bogue et al.

(10) Patent No.: US 7,875,141 B2
(45) Date of Patent: Jan. 25, 2011

(54) REPAIR OF A COMPOSITE SANDWICH STRUCTURE HAVING A PERFORATED SKIN

(75) Inventors: Wiliam F. Bogue, Hebron, CT (US); John M. Robertson, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/821,774

(22) Filed: Jun. 23, 2010

(65) Prior Publication Data

US 2010/0258236 A1 Oct. 14, 2010

Related U.S. Application Data

(62) Division of application No. 11/726,821, filed on Mar. 23, 2007, now abandoned.

(51) Int. Cl.
| | |
|---|---|
| B29C 73/00 | (2006.01) |
| B29C 65/00 | (2006.01) |
| B32B 43/00 | (2006.01) |
| B32B 37/00 | (2006.01) |
| B32B 38/10 | (2006.01) |
| B32B 38/04 | (2006.01) |
| B32B 3/12 | (2006.01) |
| B32B 3/00 | (2006.01) |
| E04B 1/82 | (2006.01) |

(52) U.S. Cl. .................. 156/98; 156/153; 156/249; 156/252; 156/268; 428/118; 428/73; 181/292; 52/145

(58) Field of Classification Search .................. 156/60, 156/94, 152, 153, 247, 249, 250, 252, 253, 156/268, 292, 303.1, 330; 428/73, 116, 117, 428/118; 181/284, 288, 290, 291, 292; 29/402.01, 29/402.09, 402.11; 52/144, 145
See application file for complete search history.

(56) References Cited

U.S. PATENT DOCUMENTS 3,704,194 A 11/1972 Harrier (Continued)

FOREIGN PATENT DOCUMENTS

EP 0895222 A2 2/1999

OTHER PUBLICATIONS

European Search Report—EP 08 25 0928—dated Mar. 26, 2009, 12 pages.

(Continued)

*Primary Examiner*—Philip C Tucker
*Assistant Examiner*—Brian R Slawski
(74) *Attorney, Agent, or Firm*—Kinney & Lange, P.A.

(57) ABSTRACT

A method of restoring a section of a composite having a honeycomb bonded to a perforated skin includes the steps of separating a first honeycomb from the perforated skin to expose a portion of the perforated skin, inserting pins through perforations in the perforated skin, extending the pins through a repair material, attaching the repair material to the exposed portion of the perforated skin, and attaching a second honeycomb to the repair material. The method may include removing material from the exposed portion of the perforated skin, prior to inserting pins through the perforations, to create a more even bonding surface for attaching the repair material.

25 Claims, 5 Drawing Sheets

U.S. PATENT DOCUMENTS

| | | | |
|---|---|---|---|
| 3,787,546 A | | 1/1974 | Pratt et al. |
| 4,257,998 A | | 3/1981 | Diepenbrock, Jr. et al. |
| 4,300,978 A | | 11/1981 | Whitemore et al. |
| 4,855,182 A | * | 8/1989 | Ondrejas et al. ............ 428/343 |
| 5,252,279 A | | 10/1993 | Gore et al. |
| 5,653,836 A | * | 8/1997 | Mnich et al. .................. 156/98 |
| 5,807,628 A | | 9/1998 | Mnich et al. |
| 5,882,756 A | | 3/1999 | Alston et al. |
| 5,935,680 A | | 8/1999 | Childress |
| 6,355,203 B1 | | 3/2002 | Charmes et al. |
| 2006/0059828 A1 | * | 3/2006 | Stevenson et al. ............. 52/514 |
| 2007/0275212 A1 | | 11/2007 | Stadtlander et al. |

OTHER PUBLICATIONS

Dr. A.A. Baker, "Repair Techniques for Composite Structures," in Composite Materials in Aircraft Structures, Chapter 13, (1986) p. 207-227.

Sam Dastin, "Repairing Advanced Composite Materials," Machine Design (Feb. 20, 1986) p. 86-90.

* cited by examiner

REPAIR OF A COMPOSITE SANDWICH STRUCTURE HAVING A PERFORATED SKIN

CROSS-REFERENCE TO RELATED APPLICATION(S)

Reference is made to the following pending applications: U.S. patent application Ser. No. 11/441,866, entitled "REPAIR OF COMPOSITE SANDWICH STRUCTURES WITH UNEVEN BOND SURFACES" and filed on May 26, 2006; and U.S. patent application Ser. No. 11/441,893, entitled "REPAIR OF PERFORATED ACOUSTIC SKINS BY REVERSE PIN TRANSFER MOLDING" and filed on May 26, 2006. This application claims priority as a divisional application under 35 U.S.C. §121 of earlier filed application Ser. No. 11/726,821 entitled "REPAIR OF A COMPOSITE SANDWICH STRUCTURE HAVING A PERFORATED SKIN" by William F. Bogue, et al. and filed Mar. 23, 2007 now abandoned, which is hereby incorporated by reference.

BACKGROUND

The present invention relates to composite structures. More particularly, the present invention relates to repairing composite structures having a perforated skin and a honeycomb core.

Composite structures are commonly known and used in, for example, gas turbine engines for aerodynamic fairings. One type of composite is a sandwich structure having a face skin, a back skin, and a honeycomb core inserted between and bonded to the face skin and the back skin. The face skin and the back skin may be laminated structures with a resin matrix, such as epoxy, and one or more plies of fiberglass. The face skin commonly includes holes or perforations that extend through a thickness of the face skin to the honeycomb.

The honeycomb may become damaged over time from an impact, elevated temperatures, abrasion, erosion, and/or other factors. In some instances, the honeycomb may be damaged even though there is no damage to the face skin. In some instances, it may be desirable to locally replace a section of honeycomb from the back skin side, rather than replace the entire composite structure. For example, a section of the original honeycomb and a corresponding section of the back skin may be cut out of the composite, and a replacement honeycomb and a replacement back skin may be attached to the face skin.

In a composite having a sandwich structure, ends of the original honeycomb press into the back skin and the face skin to form a dimpled imprint surface on the skins. The dimpled imprint results in each skin having compressed and uncompressed sections, which remain after the original honeycomb is removed. This uneven surface on the face skin makes it difficult to bond a replacement section of honeycomb to the face skin. Thus, it may be necessary to remove some of the face skin to create a more even bonding surface, before attaching the replacement honeycomb to the face skin.

Fiberglass leveling plies and adhesive may be attached to the prepared bonding surface of the face skin, prior to bonding the replacement section of honeycomb to the face skin. During a curing cycle, the perforations of the face skin commonly become blocked with adhesive, resin or fiberglass. Reforming the perforations is time consuming and may structurally damage or weaken the restored composite after curing is complete. There is a need for a method of maintaining the perforations in the face skin during a local repair of the honeycomb and the back skin of the composite.

BRIEF SUMMARY OF THE INVENTION

A method of restoring a section of a composite having a honeycomb bonded to a perforated skin includes the steps of separating a first honeycomb from the perforated skin to expose a portion of the perforated skin, inserting pins through perforations in the perforated skin, extending the pins through a repair material, attaching the repair material to the exposed portion of the perforated skin, and attaching a second honeycomb to the repair material. In some embodiments, prior to inserting pins through the perforations, material is removed from the exposed portion of the perforated skin to reduce surface variation in the perforated skin and create a more even bonding surface. In some embodiments, the repair material may include at least one leveling ply and an adhesive layer attached to either or both sides of the leveling ply (or plies).

BRIEF DESCRIPTION OF THE DRAWINGS

It is recognized that the figures are not necessarily to scale.

DETAILED DESCRIPTION

Figure 1:
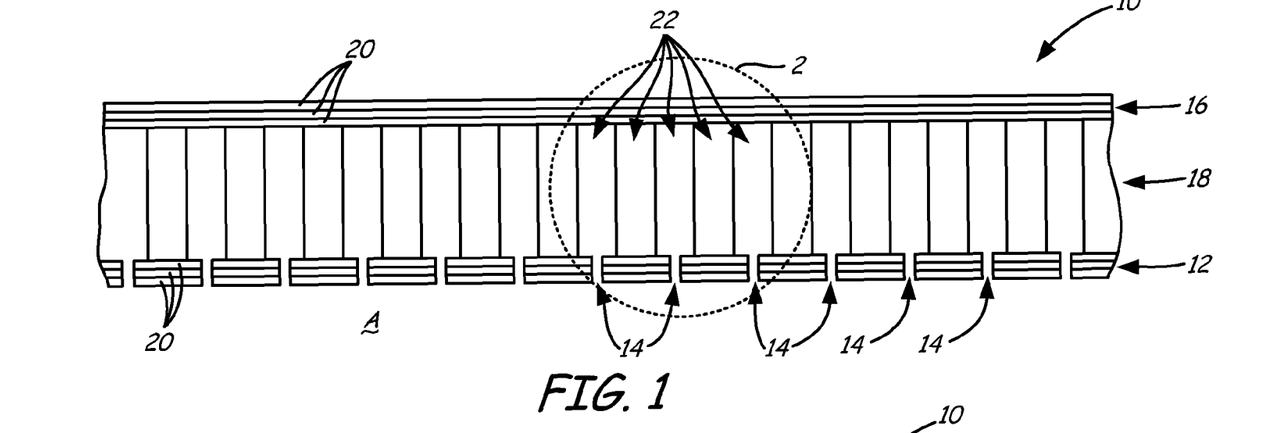
FIG. 1 is a cross-section of a composite structure having a honeycomb core sandwiched between a perforated face skin and a back skin.

FIG. 1 is a schematic of composite structure 10 which includes face skin 12 having perforations 14, back skin 16 and honeycomb core 18. As an example, composite structure 10 may be an acoustic liner used in a fan-bypass area or nacelle of a gas turbine engine for noise attenuation.

As shown in the exemplary embodiment of FIG. 1, each of face skin 12 and back skin 16 include three composite layers 20. Each composite layer 20 may be made, for example, of a resin matrix with continuous woven fiber reinforcement. The fibers may include, but are not limited to, fiberglass. The resin may include, but is not limited to, epoxy. Although in FIG. 1 skins 12 and 16 each include three composite layers, it is recognized that more or less layers may be used. Perforations 14 are openings in face skin 12 that extend through a thickness of face skin 12 from an airflow side, A, to honeycomb core 18. Honeycomb core 18 includes cell chambers 22, which operate in conjunction with perforations 14 of face skin 12 in a known manner to attenuate noise. In the exemplary embodiment of composite structure 10 shown in FIG. 1, back skin 16 is a solid skin (i.e. it does not include perforations).

A portion of honeycomb core 18 may become damaged, and it may be necessary or beneficial to locally replace a portion of honeycomb core 18, and a corresponding section of back skin 16. A repair process is described herein for replacing a portion of honeycomb core 18 and back skin 16 in such a way that composite structure 10 maintains its structural, acoustic, and dimensional properties. Moreover, the repair process includes a method of maintaining perforations 14 in face skin 12 that are located in a region where honeycomb core 18 is replaced. This avoids a need of having to reform perforations 14 in face skin 12 when the repair of honeycomb core 18 is complete, which may be time or labor intensive, and, more importantly, may damage composite structure 10 or reduce its structural integrity.

Figure 2:
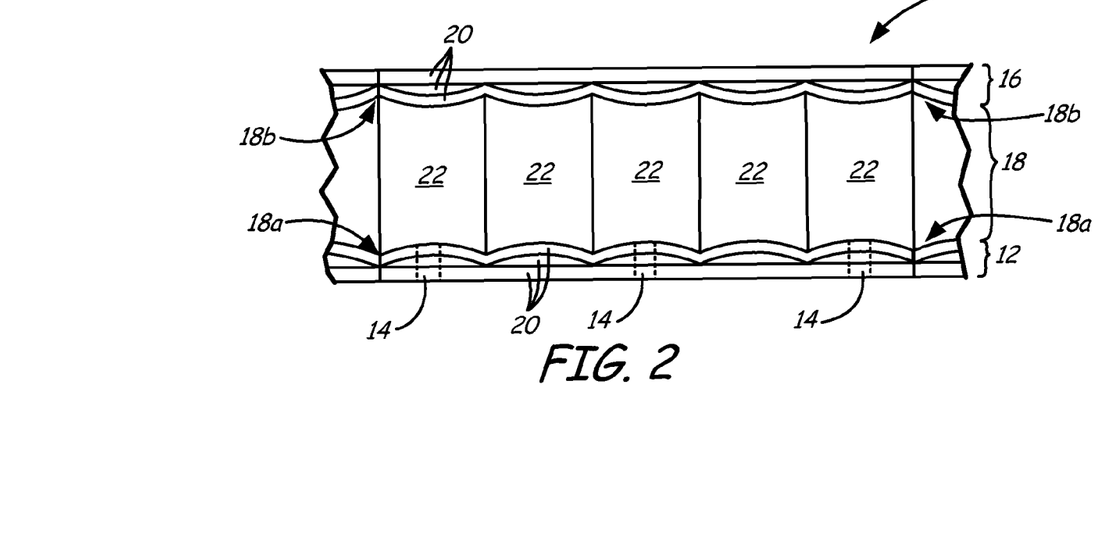
FIG. 2 is an expanded cross-sectional view of a portion of the composite structure of FIG. 1.

FIG. 2 is an expanded view of a portion of composite structure 10 of FIG. 1 to further illustrate a configuration of honeycomb core 18 having a first end 18a, a second end 18b and cell chambers 22. As shown in FIG. 2, first end 18a of core 18 is bonded to face skin 12 and second end 18b of core 18 is bonded to back skin 16. At each end 18a and 18b of core 18 where cell chambers 22 of honeycomb core 18 contact face skin 12 and back skin 16, composite layers 20 of skins 12 and 16 are compacted or compressed by a force from cell chambers 22. In between cell chambers 22, composite layers 20 are uncompressed. Thus, as shown in FIG. 2, alternating compressed and uncompressed sections of composite layers 20 result in a draped pattern across face skin 12 and back skin 16. (Although not clearly visible in FIGS. 1 and 2, each cell chamber 22 has a hexagonal shape, which forms a hexagonal imprint on face skin 12 and back skin 16, as more clearly shown in FIG. 4.) In the exemplary embodiment shown in FIG. 2, perforations 14 of face skin 12 are shown centered within each cell chamber 22 of honeycomb core 18. It is recognized that perforations 14 may be offset from cell chambers 22. It is also recognized that more or less perforations may be formed in face skin 12 relative to cell chambers 22, but it is preferred that at least one perforation 14 extends into each hexagonal cell chamber 22 to enhance acoustic attenuation, as more clearly depicted in FIG. 4.

Figure 3:
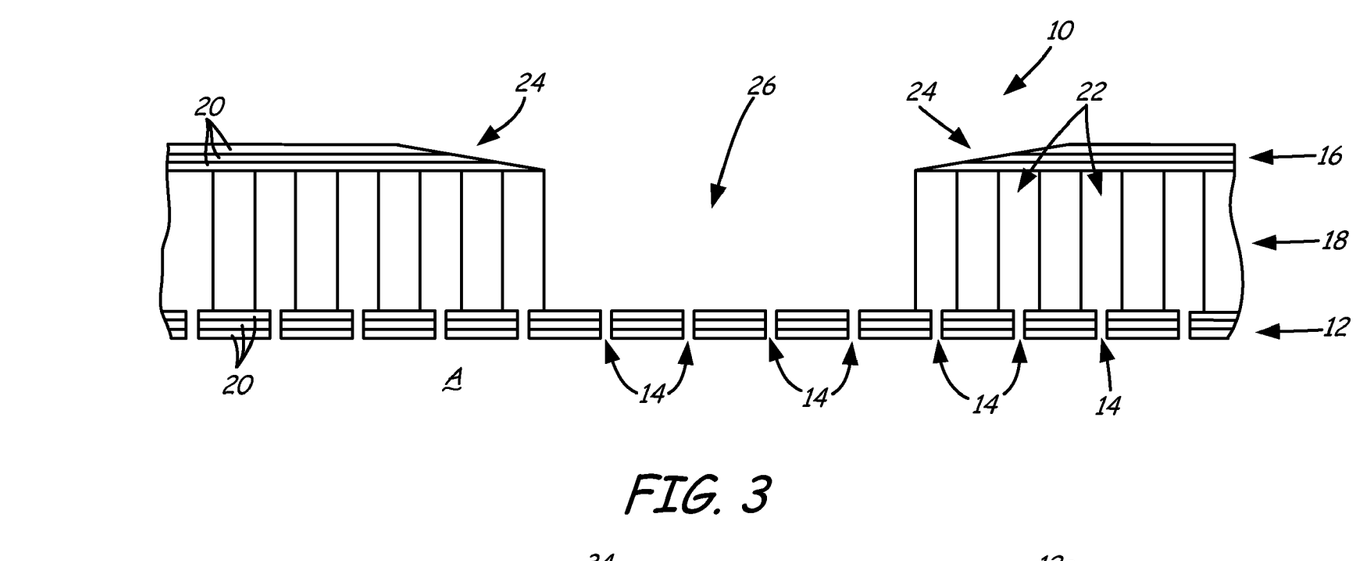
FIG. 3 is a cross-section of the composite structure of FIG. 1 to illustrate an initial step in the repair process in which a portion of the honeycomb core and the back skin are removed.

FIG. 3 illustrates a first step in the repair process to replace a portion of honeycomb core 18 of composite structure 10. As shown in FIG. 3, a portion of honeycomb core 18 and back skin 16 have been removed from structure 10. Prior to removing a portion of core 18, a larger portion of back skin 16 is first removed. In the embodiment shown in FIG. 3, the portion of back skin 16 is removed in such a way that, in area 24, remaining back skin 16 has tapered structures on each side that gradually slope downward towards area 26, where honeycomb core 18 is to be removed. Back skin 16 and honeycomb core 18 may be removed from areas 24 and 26 in any number of different ways. For example, back skin 16 may first be removed from areas 24 and 26 by cutting composite layers 20; then honeycomb core 18 may be cut-out from area 26. Alternatively, back skin 16 may be removed first from only area 24, and then back skin 16 may be removed from area 26 with the same cuts used to remove honeycomb core 18 from area 26.

Instead of a sloped taper in area 24, as shown in FIG. 3, back skin 16 may have a stepped taper. Although it is not required that remaining back skin 16 is tapered in area 24, the tapered structure supports a replacement back skin (see FIG. 9). The overlap between original back skin 16 and the replacement skin provides structural strength to composite structure 10 by allowing loads to be transferred between original back skin 16 and the replacement skin.

Figure 4:
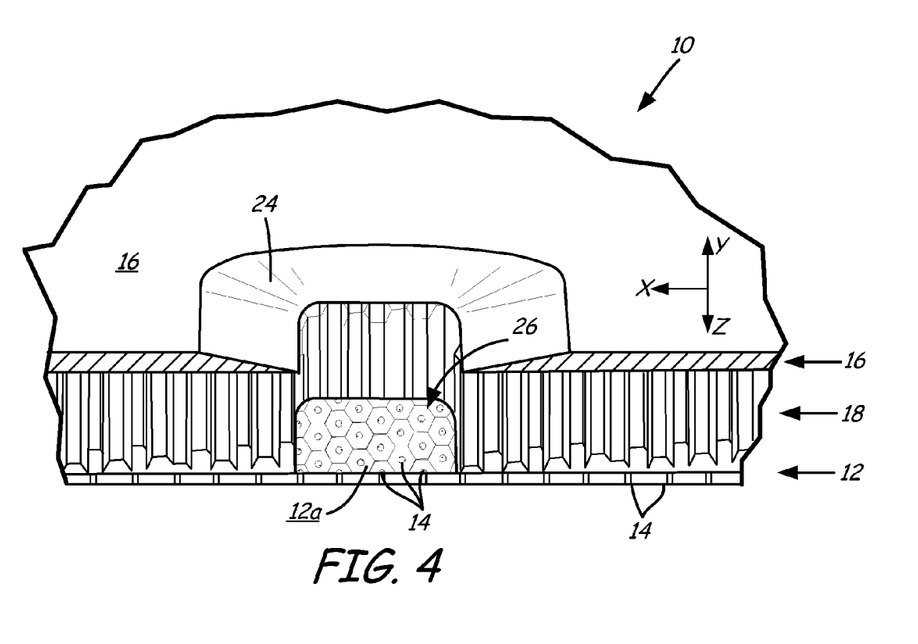
FIG. 4 is a perspective view of the composite structure of FIG. 3.

FIG. 4 is a perspective view of composite structure 10 of FIG. 3 after a portion of honeycomb core 18 and back skin 16 have been removed. As shown in FIG. 4, area 24 is the portion where back skin 16 is tapered on both sides of area 26. Area 26 represents the area where honeycomb core 18 and back skin 16 have been removed or cut-out to expose face skin 12. As shown in FIG. 4, an exposed portion 12a of face skin 12 in area 26 includes a dimpled imprint left-over from the removed honeycomb core.

Although not visible in FIGS. 3 and 4, exposed portion 12a of face skin 12 in area 26 is an uneven surface which is caused by the compression of cell chambers 22 at first end 18a of honeycomb core 18 in some areas of face skin 12 (see FIG. 2). Thus, the repair process includes a partial leveling of exposed portion 12a of face skin 12 to produce a more even bonding surface for receiving a repair material and a replacement honeycomb.

Figure 5:
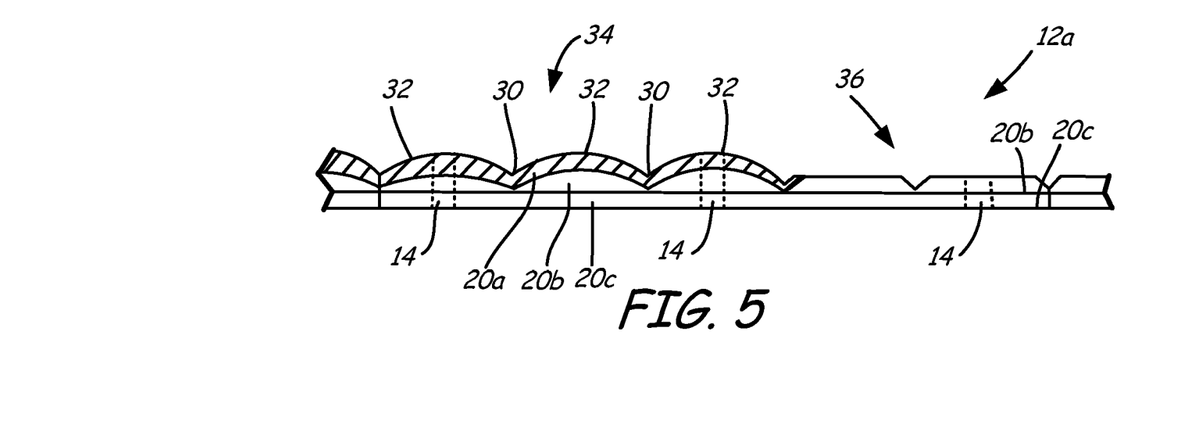
FIG. 5 is a cross-section of a portion of the face skin of the composite structure to illustrate a step in the repair process to make a bonding surface of the face skin more even.

FIG. 5 is a cross-sectional view of exposed portion 12a of face skin 12 from area 26 of FIG. 4. The dimpled imprint on face skin 12 includes compressed sections 30 where ends of cell chambers 22 pressed into face skin 12, and relatively uncompressed sections 32 that were between the ends of cell chambers 22. This structure results in face skin 12 having uneven surface 34.

In the exemplary embodiment of composite structure 10, face skin 12 includes three fiberglass layers 20a, 20b and 20c having a cured epoxy resin matrix. High spots of top composite layer 20a may be locally removed, as shown in FIG. 5, such that middle composite layer 20b is exposed. This results in a more even surface 36 for bonding a replacement honeycomb section thereto. (Surface 36 may also be referred to as bonding surface 36.) A flatter bonding surface facilitates a more durable bond between surface 36 and whatever it is bonded to because the adhesive thickness is less variable. As shown in FIG. 5, one composite layer 20a was removed from face skin 12. It is recognized that more than one composite layer or less than one composite layer may be removed. (For reference, see U.S. patent application Ser. No. 11/441,866, entitled "REPAIR OF COMPOSITE SANDWICH STRUCTURES WITH UNEVEN BOND SURFACES.")

FIG. 5 shows face skin 12 as removal of top composite layer 20a is in progress. Top layer 20a may be removed in a variety of different ways. For example, top layer 20a of face skin 12 is mechanically removed using a grinding, sanding, or other known mechanical process.

After completing removal of top layer 20a, such that exposed portion 12a of face skin 12 is essentially an even surface, a repair material may be attached to bonding surface 36. The repair material is configured to adequately bond face skin 12 to a replacement section of honeycomb. Because adhesive and a curing process are involved in attaching the repair material to surface 36 of face skin 12, perforations 14 in face skin 12 may become blocked with adhesive and/or repair material during the repair process. In order to maintain perforations 14, pins may be inserted through some of perforations 14 of face skin 12 prior to attaching the repair material.

Figure 6:
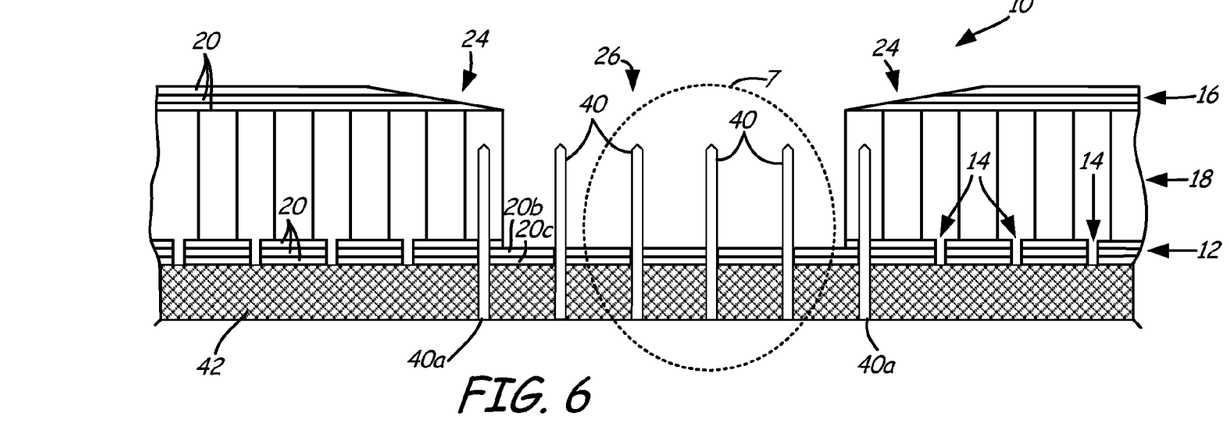
FIGS. 6-9 illustrate subsequent steps in the repair process to complete replacement of a section of the honeycomb core and the back skin.

FIG. 6 is a schematic of composite structure 10 after pins 40 have been inserted through perforations 14 to maintain perforations 14 during attachment of the repair material to a portion of face skin 12. (Note that in FIG. 6, in area 26, face skin 12 only includes two composite layers 20b and 20c, since portions of top composite layer 20a were removed prior to insertion of pins 40.) As shown in FIG. 6, pins 40 are not inserted through all of perforations 14 of face skin 12; rather, pins 40 are inserted through those perforations in area 26 where honeycomb core 18 has been removed. Moreover, an extra pin 40a is inserted on each side of area 26 to account for any adhesive run-off during the curing process. It is recognized that pins 40 may be inserted into all perforations 14 of face skin 12; however, this may be time consuming and is not necessary.

Pins 40 are inserted through face skin 12 with the aid of retaining plate 42. A rubber caul may be substituted for retaining plate 42. Generally speaking, any structure may be used if it is capable of receiving pins 40, and being temporarily secured to face skin 12, such that pins 40 are fixed inside perforations 14 and face skin 12 is supported during the curing cycle.

A diameter of pins 40 is essentially equal to or slightly less than a diameter of perforations 14. A length of pins 40 may vary so long as pins 40 are long enough to extend through plate 42, composite layers 20 and into an open space of area 26. Pins 40 are preferably short enough to not extend into an area originally occupied by back skin 16.

Figure 7:
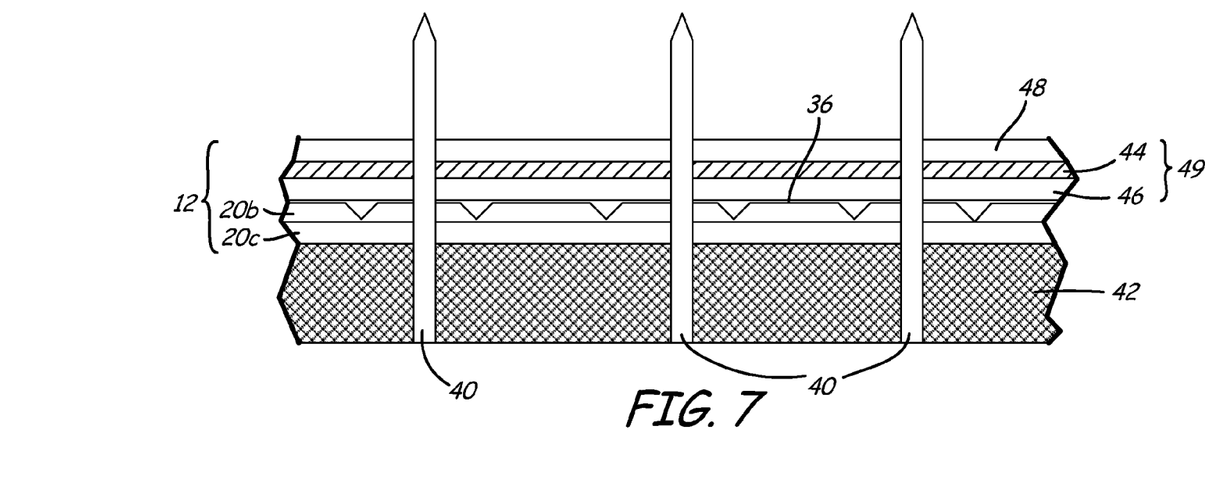

FIG. 7 is an expanded view of a portion of composite structure 10 of FIG. 6 after repair layer 49 has been bonded to surface 36 of face skin 12. Repair layer 49 includes repair material 44 sandwiched between adhesive layers 46 and 48. Repair layer 49, with original composite layers 20b and 20c, now constitutes face skin 12. As shown in FIG. 7, adhesive 46 may first be attached to surface 36 to strengthen the bond between surface 36 and repair layer 49. In an exemplary embodiment, adhesive 46 may be an epoxy film adhesive. In some embodiments, repair material 44 is similar to or identical to composite layers 20 used in face skin 12, except that material 44 is not yet compacted and resin in material 44 is not yet cured. Repair material 44 may be formed from one or more plies of fiberglass and may contain epoxy resin. Another adhesive layer 48 may be applied to repair material 44 to promote bonding between repair material 44 and a replacement section of honeycomb (see FIG. 8). Adhesive layer 48, for example, also may be an epoxy film adhesive. In some embodiments, the resin in adhesive layers 46 and 48 and the resin in repair material 44 may all be the same resin or otherwise compatible epoxy resins.

Prior to a curing process, repair material 44 is conformable. To attach repair material 44 to surface 36 of face skin 12, pins 40 are pushed through repair material 44 or repair material 44 is worked over pins 40. In either case, the result is that pins 40 extend through repair material once repair material 44 is bonded to surface 36 of face skin 12. Pins 40 are similarly pushed through adhesive layers 46 and 48, or adhesive layers 46 and 48 are worked over pins 40. In alternative embodiments, adhesive layer 46 may be a paste epoxy that is disposed onto surface 36 prior to insertion of pins 40.

Figure 8:
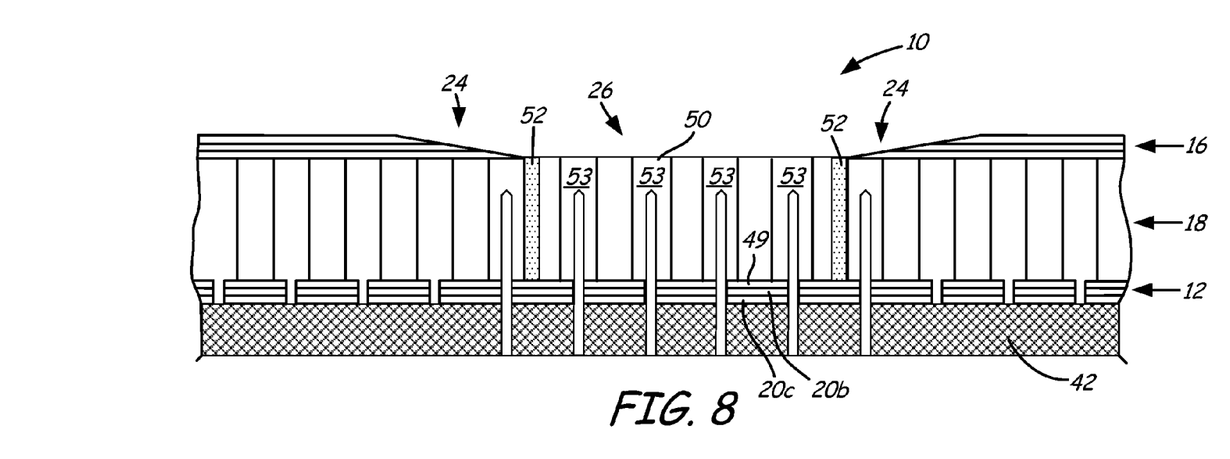

FIG. 8 is a cross-sectional view of composite structure 10 illustrating a subsequent step in the repair process in which replacement honeycomb core 50 is inserted into area 26 and attached to face skin 12, which includes repair layer 49 and original composite layers 20b and 20c. More specifically, honeycomb core 50 bonds with adhesive layer 48 (see FIG. 7) of repair layer 49 to attach to face skin 12. Honeycomb core 50 is similar to honeycomb core 18 and includes cell chambers 53.

Because honeycomb core 50 is configured such that it may collapse if it is not adequately supported, core splice adhesive 52 may be attached around a perimeter of honeycomb core 50 prior to attaching honeycomb core 50 to face skin 12. Adhesive 52 is used to support core 50, and to attach core 50 to original honeycomb core 18. Adhesive 52 may include any type of light-weight material, such as, but not limited to, an epoxy foaming adhesive, an epoxy potting compound, or an epoxy paste adhesive.

It is not necessary that cell chambers 53 of replacement honeycomb core 50 match up exactly with a pattern of original honeycomb core 18. However, if possible, positioning of replacement honeycomb core 50 may be adjusted to minimize obstruction of perforations 14 and to avoid pins 40 while replacement honeycomb core 50 is being positioned in area 26.

Figure 9:
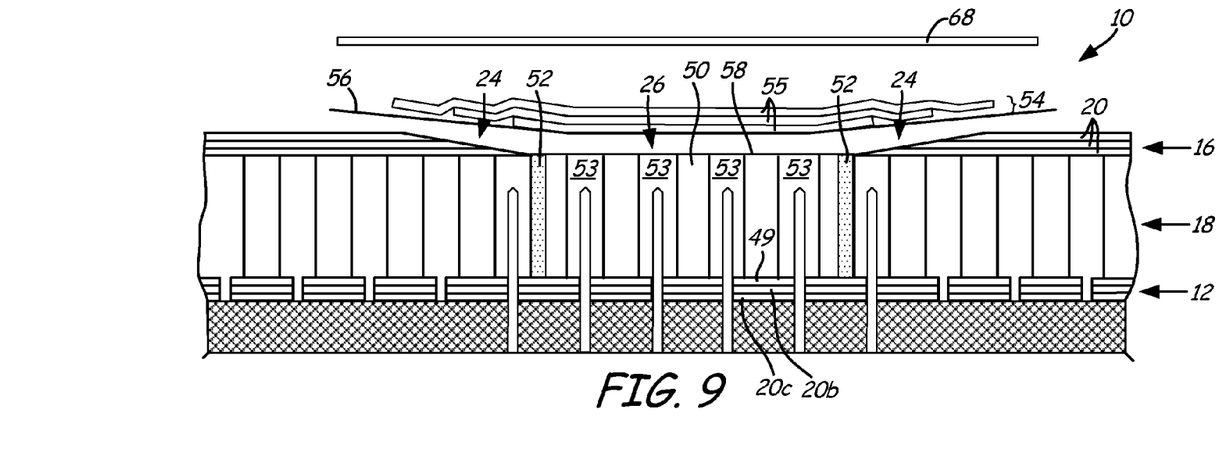

FIG. 9 is a cross-sectional view of composite 10 of FIG. 8 illustrating a final step in the repair process in which replacement back skin 54 is attached to replacement honeycomb core 50 (in area 26) and to original back skin 16 (in area 24). In the exemplary embodiment of FIG. 9, replacement back skin 54 includes three composite layers 55, which may be similar to or identical to composite layers 20 of original back skin 16. Adhesive layer 56 may be used to bond replacement back skin 54 to replacement honeycomb 50 and to composite layers 20 of original back skin 16. Adhesive layer 56 may include any suitable adhesive, such as an epoxy film adhesive. Replacement honeycomb core 50 may include adhesive layer 58 at a top portion of core 50 to further promote bonding between core 50 and skin 54.

Finally, cover ply 68 may be used to reinforce replacement back skin 54. As shown in FIG. 9, cover ply 68 preferably extends beyond area 24; in an exemplary embodiment, cover ply 68 extends beyond area 24 by at least 0.75 inches. Adhesive layer 56 may be approximately equal in dimensions to cover ply 68 such that adhesive layer 56 extends beyond replacement back skin 54, and may be used to attach cover ply 68 to original back skin 16. Cover ply 68 may be similar to composite layers 20 and 55.

High heat may next be applied to composite structure 10 to cure any resins in the various adhesive layers or composite layers in structure 10. The curing process results in structure 10 becoming a hardened laminate. Pins 40 may then be removed from perforations 14, and plate 42 is detached from composite 10. With the use of pins 40, perforations 14 in face skin 12 remain intact and no additional steps are needed to reform perforations 14. The restored area of composite 10, including replacement honeycomb core 50 and replacement back skin 54, is functionally equal to surrounding areas of composite 10.

During the curing process, composite structure 10 may also be placed under pressure, such that ends of replacement honeycomb core 50 compress face skin 12, specifically repair material 44, and replacement back skin 54. This results in the restored sections of the face skin and the back skin having a draped pattern similar to the pattern shown in FIG. 2.

The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. A method of restoring a section of a composite having a honeycomb bonded to a perforated skin, the method comprising:
   separating a first honeycomb from the perforated skin to expose a portion of the perforated skin;
   inserting pins through perforations in the perforated skin;
   extending the pins through a repair material;
   attaching the repair material to the exposed portion of the perforated skin; and
   attaching a second honeycomb to the repair material.

2. The method of claim 1 further comprising:
   removing the pins from the perforations in the perforated skin.

3. The method of claim 1 further comprising:
   positioning the pins in a retaining device prior to inserting the pins through the perforations in the perforated skin.

4. The method of claim 1 further comprising:
removing material from the exposed portion of the perforated skin to create an even bonding surface prior to inserting the pins through the perforations in the perforated skin.

5. The method of claim 1 further comprising:
applying an adhesive to an exposed portion of the perforated skin prior to inserting pins through perforations in the perforated skin.

6. The method of claim 5 wherein the adhesive is a paste epoxy.

7. The method of claim 1 wherein the repair material includes at least one leveling ply.

8. The method of claim 7 wherein the leveling ply is fiberglass.

9. The method of claim 1 wherein attaching the repair material to the exposed portion of the perforated skin includes bonding a first adhesive layer to the perforated skin and bonding the repair material to the first adhesive layer.

10. The method of claim 9 wherein attaching a second honeycomb to the repair material includes bonding a second adhesive layer to the repair material and bonding the second honeycomb to the second adhesive layer.

11. The method of claim 10 wherein the repair material, the first adhesive layer and the second adhesive layer each include an epoxy resin.

12. The method of claim 1 wherein the composite includes a solid skin and the honeycomb is sandwiched between the solid skin and the perforated skin.

13. The method of claim 12 further comprising:
removing a first section of the solid skin from the composite prior to separating the first honeycomb from the perforated skin.

14. The method of claim 13 further comprising:
attaching a replacement section of solid skin to the composite to cover the second honeycomb.

15. The method of claim 14 further comprising:
attaching at least one ply to the solid skin to cover the replacement section of solid skin.

16. A method of restoring a section of a composite having a perforated skin, a solid skin and a honeycomb between the perforated skin and the solid skin, the method comprising:
(a) removing an undesirable section of the honeycomb and a corresponding section of the solid skin from the perforated skin, wherein an exposed portion of the perforated skin includes an uneven surface;
(b) removing at least a portion of the uneven surface to form a bonding surface on the exposed portion of the perforated skin;
(c) inserting pins into openings in the perforated skin;
(d) bonding a repair material to the exposed portion of the perforated skin, wherein the pins are extended through the repair material;
(e) bonding a replacement honeycomb to the repair material;
(f) bonding a replacement solid skin to the replacement honeycomb; and
(g) removing the pins from the openings in the perforated skin.

17. The method of claim 16 wherein removing a section of the solid skin in step (a) includes tapering a remaining portion of the solid skin around the undesirable section of the honeycomb.

18. The method of claim 16 wherein the uneven surface of the perforated skin includes compressed sections and uncompressed sections, and removing a portion of the uneven surface in step (b) includes removing at least a portion of the uncompressed sections.

19. The method of claim 16 further comprising:
positioning the pins in a retaining device prior to inserting the pins into the openings in the perforated skin in step (c).

20. The method of claim 16 wherein the repair material is formed from at least one ply of fiberglass.

21. The method of claim 16 wherein bonding a repair material on the exposed portion of the perforated skin further comprises:
attaching a first adhesive layer to the exposed portion of the perforated skin;
bonding the repair material to the first adhesive layer; and
bonding a second adhesive layer to the repair material.

22. The method of claim 21 wherein the pins are extended through the first adhesive layer and the second adhesive layer.

23. The method of claim 21 wherein the first adhesive layer is attached to the exposed portion of the perforated skin prior to inserting the pins into the openings in the perforated skin in step (c).

24. The method of claim 16 further comprising:
attaching an adhesive around a perimeter of the replacement honeycomb prior to step (e) to support the replacement honeycomb.

25. The method of claim 16 further comprising:
attaching a cover material to the solid skin after step (f) to cover the replacement solid skin.

* * * * *